United States Patent Office 2,934,425
Patented Apr. 26, 1960

2,934,425
METHOD FOR PURIFYING URANIUM

James B. Knighton, Brookfield, and Harold M. Feder, Park Forest, Ill., assignors to the United States of America as represented by the United States Atomic Energy Commission No Drawing. Application June 30, 1958
Serial No. 745,777

13 Claims. (Cl. 75—84.1)

This invention relates to a pyrometallurgical method for purifying uranium which has been employed as fuel or blanket material in a nuclear reactor. The invention applies not only to metallic uranium but also to oxides of uranium. In more detail, the invention relates to a method for separating plutonium and fission products from uranium employing zinc as solvent.

Pyrometallurgical methods for processing nuclear materials are potentially of great importance because such methods lend themselves to continuous and remote operation with the valuable materials being maintained in compact metallic forms which are processed with radiation-damage-resistant reagents only. Zinc is particularly useful as solvent because high-purity zinc is readily available, it has a relatively low melting point, all common metals are sufficiently soluble therein that an entire fuel or blanket element can be dissolved in a single operation, and a readily separable crystalline intermetallic compound of uranium and zinc is formed.

A method for purification and reduction of uranium is disclosed in copending patent application Serial No. 665,105, filed June 11, 1957, in the names of James B. Knighton, Leslie Burris, Jr., and Harold M. Feder, now Patent No. 2,922,711, issued January 26, 1960. According to this application uranium is purified by dissolving it in zinc, crystallizing an intermetallic compound of uranium and zinc from the solution by cooling, separating the crystals from the solution and decomposing the intermetallic compound by vaporizing the zinc. That application also discloses the simultaneous purification and reduction of uranium oxides by employing a zinc-magnesium alloy to dissolve the uranium.

The present invention represents a modification of that described in the above-identified application which makes possible a separation of plutonium from the uranium and also avoids the rather time-consuming step of vaporizing zinc. The invention is expected to find particular application in processing blanket elements of a breeder reactor.

It is accordingly an object of the present invention to provide a method for processing uranium-base nuclear materials.

Another object of the present invention is to separate plutonium and fission products from uranium.

It is also an object of the present invention to reduce compounds of uranium to metallic uranium and purify the uranium simultaneously.

These and other objects of the present invention are attained by our novel method for the separation of uranium and plutonium wherein a uranium-base material is dissolved in zinc and the uranium is precipitated therefrom by adding magnesium to the solution. As will be seen hereafter, uranium is substantially completely insoluble in a mixture of magnesium and zinc, while plutonium is quite soluble therein. Therefore uranium and plutonium can be separated by this procedure. It also may be desirable to crystallize intermetallic compounds of uranium and plutonium and zinc from the zinc solution by cooling, as is suggested in the above-identified application. The precipitated intermetallic compound is then separated from the supernatant solution by filtration, centrifugation, or decantation. The intermetallic compound may then be decomposed by melting the crystals with magnesium and cooling whereby metallic uranium precipitates therefrom leaving plutonium in solution. If the uranium is originally present as a binary compound such as $UO_2$, the binary compound can be reduced to metallic uranium simultaneously to the separation by employing a zinc-magnesium alloy to dissolve the uranium. It is known that an alloy containing 6% or more magnesium will reduce uranium dioxide. The minimum amount of magnesium necessary is not known at present. Addition of an excess of magnesium will then cause the precipitation of the uranium. Also excess zinc may be removed by distillation to precipitate uranium. In either case the concentration of magnesium is increased until uranium precipitates therefrom.

It will be understood that this procedure may be repeated as often as desired and that it may be combined with other types of separations. For example, separations by selective oxidations and reductions may be performed prior to employing this invention.

According to the invention the uranium-base material is dissolved in zinc at about 700–800° C. Two alternatives are now possible. First, an amount of magnesium sufficient to precipitate uranium may be added to the solution. It is known that an amount of magnesium sufficient to form the zinc-magnesium eutectic will accomplish this purpose. Secondly, the amount of solution to be worked with can be reduced by cooling the solution to a few degrees above the melting point of zinc and holding it at this temperature until crystallization of an intermetallic compound of uranium and zinc having a formula now believed to be approximately $U_2Zn_{17}$ occurs. Most of the plutonium present will also crystallize out as an intermetallic compound. The crystals are then separated from the remaining zinc by filtration and are melted with magnesium which is added in an amount sufficient to form the zinc-magnesium eutectic. The crystals may be melted first and the magnesium added to the melt or the intermetallic compound and the magnesium may be mixed first and then melted together. Following the precipitation of uranium according to either alternative, the crystals are separated from the solvent by suitable means such as decantation. The plutonium and fission products remain in solution and the uranium is obtained relatively free from plutonium and fission products. The solution may then be distilled to separate the plutonium from the zinc and magnesium.

The equipment employed to carry out the method may be made of most refractory materials compatible with the use of zinc. At the temperatures employed in the process graphite, silicon carbide, mullite, zirconia, tungsten, and tantalum are suitable container materials. Porous graphite and porous alumina make suitable filtration media. The following example illustrates the manner of carrying out the invention.

EXAMPLE

A sample containing 69.16 grams of uranium, .1 milligram americium and .83 gram of plutonium was dissolved at 800° C. in 2000 grams of zinc. The solution was cooled to 550° C. and decanted. The zinc phase contained 1506.26 grams zinc, .044 gram plutonium, and .77 gram uranium or only 1.1% of the initial uranium. The crystals weighed 563.3 grams and were mixed at 825° C. with 457.8 grams of magnesium. The mixture was cooled to 450° C. and decanted. The solution contained 849.3 grams of the zinc-magnesium eutectic, 0.512 gram plutonium (62% of the initial plutonium) and approximately 5.5% of the initial uranium. The precipitate weighed 171.32 grams. This precipitate was mixed with 376.2 grams magnesium at 800° C. as a wash and then decanted at 760° C. The wash weighed 421.9 grams containing .0518 gram plutonium and .118 gram uranium (.14% of initial uranium). The remainder weighed 125.62 grams containing 64.5 grams of uranium (93.3% of the initial uranium) and .0133 gram of plutonium (1.6% of the initial plutonium).

It will be noted that the analytical results account for only 75% of the plutonium. The reason for this is not clear at present but the discrepancy may be accounted for by analytical difficulties. However, it is clear that at least 98.4% of the initial plutonium is removed from the uranium and that 93.3% of the uranium is obtained relatively free of plutonium.

Although the first decantation was carried out at 550° C., the separation is more effective if the decantation is carried out at 430° C. Likewise the second decantation would be more effective if carried out at 350° C. rather than 450° C. It will be apparent that a separation between uranium and fission products is also attained by this procedure. The above-identified patent application gives examples illustrating the effectiveness of the unmodified process. The process according to the present invention is, of course, at least equally effective.

As has been shown, uranium is precipitated from the eutectic of zinc and magnesium which contains 53.5 wt. percent zinc and 46.5 wt. percent magnesium. It is known that an intermetallic compound of uranium and zinc it precipitated from a solution which contains about 84% zinc. It is not known at the present time exactly where uranium starts precipitating rather than the intermetallic compound. It is known that, provided sufficient magnesium is added to form the eutectic, uranium will be precipitated. The solubility of uranium in the eutectic has been determined as follows.

*Solubility of uranium in Zn—46.5 w./o. Mg*

| | |
|---|---|
| 500° C. | 0.060 |
| 550° C. | .077 |
| 600° C. | .10 |
| 650° C. | .125 |
| 700° C. | .153 |
| 750° C. | .184 |
| 800° C. | .22 |

It is thus clear that very complete precipitation of the uranium is obtained from the eutectic. The little uranium retained in the eutectic can be regained by various recycling procedures or other types of processing known to the art. The example shows that plutonium is sufficiently soluble in zinc and in the zinc-magnesium eutectic that a very complete separation between uranium and plutonium can be attained by the method according to the present invention.

It will be understood that this invention is not to be limited to the details given herein but that it may be modified within the scope of the appended claims.

What is claimed is:

1. A process for purifying a uranium-base nuclear material comprising dissolving the nuclear material in a solvent selected from the group consisting of zinc and a zinc-magnesium alloy, increasing the concentration of magnesium in the solvent until uranium precipitates, and separating the precipitate from the solvent.

2. A process according to claim 1 in which the concentration of magnesium is increased until the zinc-magnesium eutectic is formed.

3. A process for purifying a uranium-base nuclear material after its use in a nuclear reactor comprising dissolving the nuclear material in a solvent selected from the group consisting of zinc and a zinc-magnesium alloy, adding directly to the solution sufficient magnesium to precipitate uranium therefrom while plutonium remains in solution, and separating the solvent and the precipitate.

4. A process for purifying a metallic-uranium-base nuclear material comprising dissolving the nuclear material in molten zinc, adding directly to the solution sufficient magnesium to form the zinc-magnesium eutectic whereby plutonium remains in solution and uranium precipitates therefrom, and separating the precipitate from the solvent.

5. A process for purifying a uranium-compound-base nuclear material comprising dissolving the nuclear material in an alloy of magnesium and zinc containing at least about 6% magnesium, increasing the concentration of magnesium in the solvent to form the zinc-magnesium eutectic whereby plutonium remains in solution and uranium precipitates therefrom, and separating the precipitate from the solvent.

6. A process according to claim 5 wherein the concentration of magnesium is increased by adding magnesium to the solution.

7. A process according to claim 5 wherein the concentration of magnesium is increased by distilling zinc from the solution.

8. A process for purifying a uranium-base nuclear material comprising dissolving the nuclear material in a solvent selected from the group consisting of zinc and a zinc-magnesium alloy, cooling the solution to precipitate intermetallic compounds of uranium and plutonium and zinc therefrom, separating the intermetallic compounds from the supernatant liquid, melting the precipitated intermetallic compounds with sufficient magnesium to form the zinc-magnesium eutectic, cooling until uranium precipitates therefrom while plutonium remains in solution, and separating the precipitate from the solvent.

9. A process for purifying a metallic-uranium-base nuclear material comprising dissolving the nuclear material in molten zinc, cooling the solution to precipitate intermetallic compounds of uranium and plutonium and zinc therefrom, separating the intermetallic compounds from the supernatant liquid, melting the precipitated intermetallic compounds with sufficient magnesium to form the zinc-magnesium eutectic, cooling until uranium precipitates therefrom while plutonium remains in solution, and separating the precipitate from the solvent.

10. A process for purifying a uranium-compound-base nuclear material comprising dissolving the nuclear material in a zinc-magnesium alloy containing at least about 6% magnesium, cooling the solution to precipitate intermetallic compounds of uranium and plutonium and zinc therefrom, separating the intermetallic compounds from the supernatant liquid, melting the precipitated intermetallic compounds with sufficient magnesium to form the zinc-magnesium eutectic and cooling until uranium precipitates therefrom while plutonium remains in solution, and separating the precipitate from the solvent.

11. In a process for purifying uranium which has been used as blanket material in a nuclear reactor in which the uranium is dissolved in molten zinc, the improvement comprising precipitating the uranium from the zinc solution by adding sufficient magnesium to form the zinc-magnesium eutectic thereto, and separating the precipitate from the solvent.

12. A method for removing zinc from a solid intermetallic compound thereof with uranium comprising melting the intermetallic compound with magnesium to form the zinc-magnesium eutectic with the zinc of the intermetallic compound, cooling, and recovering the precipitated uranium.

13. A method for separating uranium from plutonium comprising dissolving the uranium and plutonium in zinc at a temperature of approximately 800° C., cooling the solution to a temperature slightly above the melting point of zinc, separating the crystals formed from the supernatant liquid, mixing sufficient magnesium to form the zinc-magnesium eutectic with the crystals at a temperature of approximately 825° C., cooling the mixture to a temperature slightly above the melting point of the eutectic, separating the precipitated uranium from the solution, mixing the precipitated uranium with magnesium at a temperature of about 800° C., and recovering the uranium.

References Cited in the file of this patent

UNITED STATES PATENTS

| | | |
|---|---|---|
| 1,728,940 | Marden | Sept. 24, 1929 |
| 1,728,942 | Marden | Sept. 24, 1929 |
| 2,778,730 | Spedding et al. | Jan. 22, 1957 |

OTHER REFERENCES

Bureau of Mines, Report 5007, November 1953, pages 16–17.

International Conference on the Peaceful Uses of Atomic Energy, 1956, vol. 9, pages 581–582.

Journal of Metals, January 1957, pages 51–57.